United States Patent [19]

Lacroix et al.

[11] Patent Number: 4,727,540
[45] Date of Patent: Feb. 23, 1988

[54] APPARATUS FOR REMOTE SIGNALLING ON A DIGITAL TRANSMISSION LINK

[75] Inventors: Jean-Claude Lacroix, Bruyeres le Chatel; Pierre Franco, Fresnes; Stéphane Le Gall, Sceaux; Gérard Bourret, La Ville du Bois; Jacques Pochet, Le Plessis Pate, all of France

[73] Assignee: Compagnie Industrielle Des Telecommications Cit-Alcatel, Paris, France

[21] Appl. No.: 802,391

[22] Filed: Nov. 27, 1985

[30] Foreign Application Priority Data

Nov. 30, 1984 [FR] France ................ 84 18318

[51] Int. Cl.$^4$ .............................................. H04J 3/12
[52] U.S. Cl. ............................ 370/110.1; 340/825.04
[58] Field of Search ................ 370/76, 110.1; 455/38, 455/92; 375/3, 25; 340/825.04

[56] References Cited

U.S. PATENT DOCUMENTS

| | | | |
|---|---|---|---|
| 3,270,338 | 8/1966 | Watters | 375/25 |
| 3,575,554 | 4/1971 | Schmidt | 375/114 |
| 3,718,767 | 2/1973 | Ellis | 370/76 |
| 4,128,809 | 12/1978 | Kage | 375/100 |
| 4,211,920 | 7/1980 | Wakabayash | 455/601 |
| 4,347,607 | 8/1982 | Nixon et al. | 370/110.1 |
| 4,509,199 | 4/1985 | Ichihara | 370/110.1 |
| 4,512,015 | 4/1985 | Kano et al. | 370/110.1 |
| 4,520,477 | 5/1985 | Wen | 370/110.1 |
| 4,550,403 | 10/1985 | Beynie | 370/110.1 |
| 4,583,237 | 4/1986 | Haskell | 375/25 |

FOREIGN PATENT DOCUMENTS

| | | |
|---|---|---|
| 0090728 | 5/1983 | European Pat. Off. . |
| 0091619 | 10/1983 | European Pat. Off. . |
| 2131657 | 6/1984 | United Kingdom . |

OTHER PUBLICATIONS

Proceedings of the IEEE, vol. 68, No. 10, Oct. 1980, pp. 1299-1303, NY, U.S., C. D. Anderson et al., "An Undersea Communication System using Fiberguide Cables".

Primary Examiner—Robert L. Griffin
Assistant Examiner—Stephen Chin
Attorney, Agent, or Firm—Sughrue, Mion, Zinn, Macpeak & Seas

[57] ABSTRACT

Apparatus for implementing a remote signalling method which consists in momentarily replacing the transmitted digital data stream by a remote signalling message which is built up from not more than n identical and nonconsecutive sequences of N bits, with the first sequence of each message being present on each occasion that a message is sent, and with the remaining n−1 sequences of each message representing, by their presence or absence, the values 0 or 1 of n−1 digits in a binary number encoding remote signalling data. FIG. 2 shows a circuit for transmitting a remote signalling message from an equipment along a very high data rate digital link, which equipment is provided with a circuit (6') for detecting and handling alarms, and a circuit (3) for recovering the bit rate from the digital stream. An OR gate (12) associated with dividers (10, 11) implemented in a high speed ECL technology generates a repetitive 1000 pattern on which a sequence is based, and switching device (13) also implemented in high speed ECL technology serves to insert sequences of said pattern into the digital stream to constitute a remote signalling message. The switching device is controlled by message-building logic circuits made from slower I$^2$L or Schottky technology.

3 Claims, 3 Drawing Figures

APPARATUS FOR REMOTE SIGNALLING ON A DIGITAL TRANSMISSION LINK

The present invention relates to remote surveillance of equipment distributed along a digital transmission link.

BACKGROUND OF THE INVENTION

In order to meet requirements for operating lifetime and reliability as needed by very long distance transmission links, it has become necessary to provide a degree of redundancy in optical fiber transmission systems, in particular concerning the laser diodes which are fitted in the repeaters. This redundancy is obtained by initially equipping each repeater with several spare laser diodes which are brought into operation one by one by a switching circuit. Such a configuration requires means for remotely controlling the repeater switching circuits from the line's terminal equipment, together with remote signalling means from each repeater for informing the terminal equipment on the state of the laser diodes in service.

U.S. Pat. No. 4,281,416 describes an optical fiber digital link fitted with remote control enabling the laser diode in service in each repeater to be replaced by a spare laser diode, together with remote signalling specific to each repeater enabling an alarm to be transmitted when the bias current of the laser diode in service exceeds a threshold. The remote control signal is constituted by a digital message which is of the same nature as the digital signal transmitted over the link, and which is inserted into the transmitted traffic by the remote surveillance terminal. This digital message is repeated consecutively several times in order to avoid spurious operation, and it is constituted by a portion which identifies the repeater concerned, and a portion which identifies which laser diode is to be put into service in that repeater. The remote signalling signal is a pattern of the same nature as the transmitted digital signal, it is a signal which replaces traffic, and it is constituted by a pseudo-random binary string whose initial value identifies the source repeater.

This remote signalling system has the drawback of requiring each repeater to be fitted with a source of pseudo-random strings which is capable of operating at the digital signal bit rate which, in an optical fiber digital transmission system, is an extremely high rate and must be provided using ECL technology and therefore consumes a great deal of energy. This constitutes a significant increase in the total energy consumed by the repeater, and above all it constitutes a considerable increase in the heat which the repeater must be capable of dissipating.

The above-described prior art system also suffers from the drawback of interrupting the link for a period of time which is long enough to cause synchronization to be lost in the digital data stream hierarchy, which means that such a signalling system can only be used for transmitting major alarms.

Preferred implementations of the present invention avoid these drawbacks and provide remote signalling using a message which momentarily replaces the data stream conveyed by the link, which requires a minimum of very fast circuits for generating the message, and which do not disturb the digital data stream and the processing thereof other than at the instants at which the message is being transmitted.

SUMMARY OF THE INVENTION

The present invention provides an apparatus for implementing a remote signalling method for use from equipments distributed along a digital transmission link and consists in transmitting the signalling along the link by means of a digital message at the same bit rate as the digital data stream conveyed by the link, with the signalling message being momentarily substituted for the conveyed data, said digital message being constituted by not more than n identical and non-consecutive sequences of N bits (where n and N are integers greater than one), which sequences follow one another over n successive time intervals of duration T, with the first sequence being present whenever such a message is sent, and with the presence or absence of the n−1 other sequences during their respective time intervals being representative of the binary values 0 or 1 of n−1 digits of a binary number encoding remote signalling data.

The configuration of the sequences used for encoding the remote signalling data, the identity of the transmitter, and the nature of the alarm may be chosen to be mutually unique within the sole constraints of avoiding, as far as possible, any possibility of spurious imitation by the digital data stream, and of facilitating signal generation from the recovered clock signal which is in any case always available at intermediate equipment in a digital transmission link.

In order to avoid imitation by the digital data stream, advantage may be taken of the relative rareness of such remote signalling messages to give the remote signalling message sequences a configuration which is considered to be illegal by the redundant code used for line transmission. This may be done in such a manner as to enable error surveillance to be obtained by means of a pattern generated from a simple logical combination of first subharmonics of the clock recovered from the data stream, thereby requiring only a small number of logic circuits which need to operate at high speed.

Digital messages using such sequences may be built up at a slower speed than the speed of the data stream, thereby enabling a less energy-hungry technology to be used, e.g. I²L or Schottky technology.

BRIEF DESCRIPTION OF THE DRAWINGS

An embodiment of the invention is described by way of example with reference to the accompanying drawings, in which.

MORE DETAILED DESCRIPTION

Figure 1:
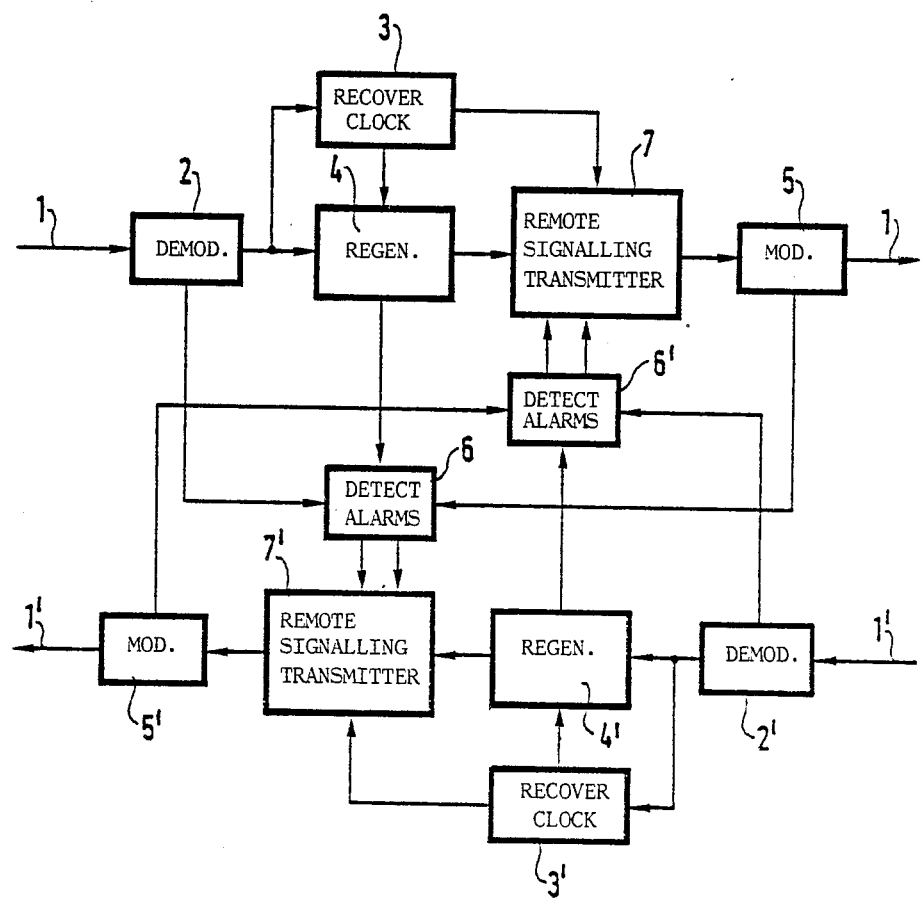
FIG. 1 is a block diagram showing how the circuits for transmitting remote signalling messages are included in a two-way repeater in an optical fiber digital transmission link.

The remote signalling described below is applicable to an optical fiber digital transmission link operating at 344 Mbits/s using a 5B/6B line code and conveying a multiplex organized in 7 μs frames each subdivided into seven sectors. The multiplex is built up from two digital streams each operating at 140 Mbits/s, which streams are themselves the result of fourth order digital multiplexing using a hierarchy in compliance with the G700 series of CCITT recommendations. The remote signalling system is capable of serving up to 256 equipments distributed along the link and of signalling two types of anomaly per equipment. To this end, the signalling system uses a message capable of having 512 possible different values and constituted by not more than ten identical and non-consecutive sequences which succeed one another over ten equal and consecutive time intervals. The first sequence is always present and serves as a prefix indicating that a remote signalling message is about to start, whereas the nine other sequences may be present or absent in their respective time intervals, thereby conveying the binary values 0 or 1 of the nine bits of a binary number capable of encoding a maximum of 512 possible values.

The configuration of each sequence must be recognizable in the data stream on the line even in the presence of a high error rate, it must be easy to generate, it must not disturb the circuits for recovering the digital data rate which are distributed amongst the various equipments along the link, and it must not compromise subsequent synchronization of the digital stream hierarchy. These requirements are satisfied by building up each sequence from a binary pattern (1000) having a $q=4$ bits which pattern is repeated several times at the 344 Mbits/s rate in synchronization with the digital data stream. This pattern momentarily replaces the 5B/6B encoded data stream and provokes up to a maximum of six successive pulse absences, which is well within the tolerances of the clock recovery circuits, which cannot be imitated by the digital data stream beyond four repetitions (even supposing that there is an error on any one group of 16 consecutive bits in the data stream), and which is easily generated using a NOR logical operation between two rectangular clock signals, one of which is at one-half of the clock rate of the data stream and the other of which is at one-fourth thereof.

A sequence must be recognizable in the digital data stream on the line even in the presence of a high error rate, e.g. $10^{-2}$. Assuming that there is an error in the sequence, and taking account of the possibility that the digital data stream could imitate three repetitions of a pattern, but not four, a sequence will be recognizable with as little as eight repetitions of the pattern, i.e. having a duration of about 93 ns. A long sequence facilitates the use of relatively slow circuits for building up the remote surveillance message. However, the sequence must not disturb hierarchy synchronization in the digital stream, and it must therefore be shorter in duration than the duration of one sector of a frame at the highest level of hierarchy in the 344 Mbits/s stream. A value of 350 ns corresponds to 30 repetitions of the pattern and is a good compromise.

The duration of the consecutive time intervals at the beginnings of which sequences may be inserted into the digital stream is chosen in such a manner that inserting two consecutive sequences does not disturb two consecutive sectors in the same place in a frame at any of the levels of the multiplex hierarchy, thereby avoiding the loss of several frame-locking words or the loss of more than one justification bit in a frame. In the present example, said duration is chosen to be equal to the duration of 3072 bits in the digital stream, i.e. substantially equal to 8.83 μs, thereby conferring a total duration of about 80.72 μs to a remote signalling message.

FIG. 1 is a block diagram of a two-way repeater in a digital transmission link. Each path of the repeater is fitted with a circuit for transmitting remote signalling under the control of a circuit for detecting and handling alarms, which circuit monitors the other path through the repeater.

One of the paths regenerates optical signals conveyed by an optical fiber 1 in one direction and the other path regenerates optical signals conveyed by an optical fiber 1' in the other direction. In conventional manner, each path includes: an opto-electrical demodulator 2, 2' receiving the optical signal to be regenerated from the corresponding optical fiber 1, 1'; electronic pulse shaping circuits essentially constituted by a bit rate recovery circuit 3, 3' and a regenerator circuit 4, 4'; and an optical modulator 5, 5' which receives the regenerated signal and which re-inserts it into the optical fiber 1, 1'. Each path is additionally fitted with a circuit for detecting and handling alarms 6, 6' which circuit monitors correct operation of the above-mentioned components, and is capable of transmitting two types of alarm. Finally, each path is fitted with a remote signalling transmitter circuit 7, 7' which is inserted between the regenerator circuit 4, 4', and the optical modulator 5, 5', and which is controlled both by the bit-rate recovery circuit of the same path 3, 3' and by the circuit for detecting and handling alarms 6', 6 of the other path.

When an anomaly is detected on one of the paths, the circuit for detecting and handling alarms 6, 6' causes a remote signalling message to be transmitted over the other path towards the terminal which is situated upstream from the detected anomaly on the path suffering therefrom, thereby allowing said terminal to take appropriate action such as diverting traffic or remotely controlling a structural modification, e.g. switching over to the another laser diode.

Figure 2:
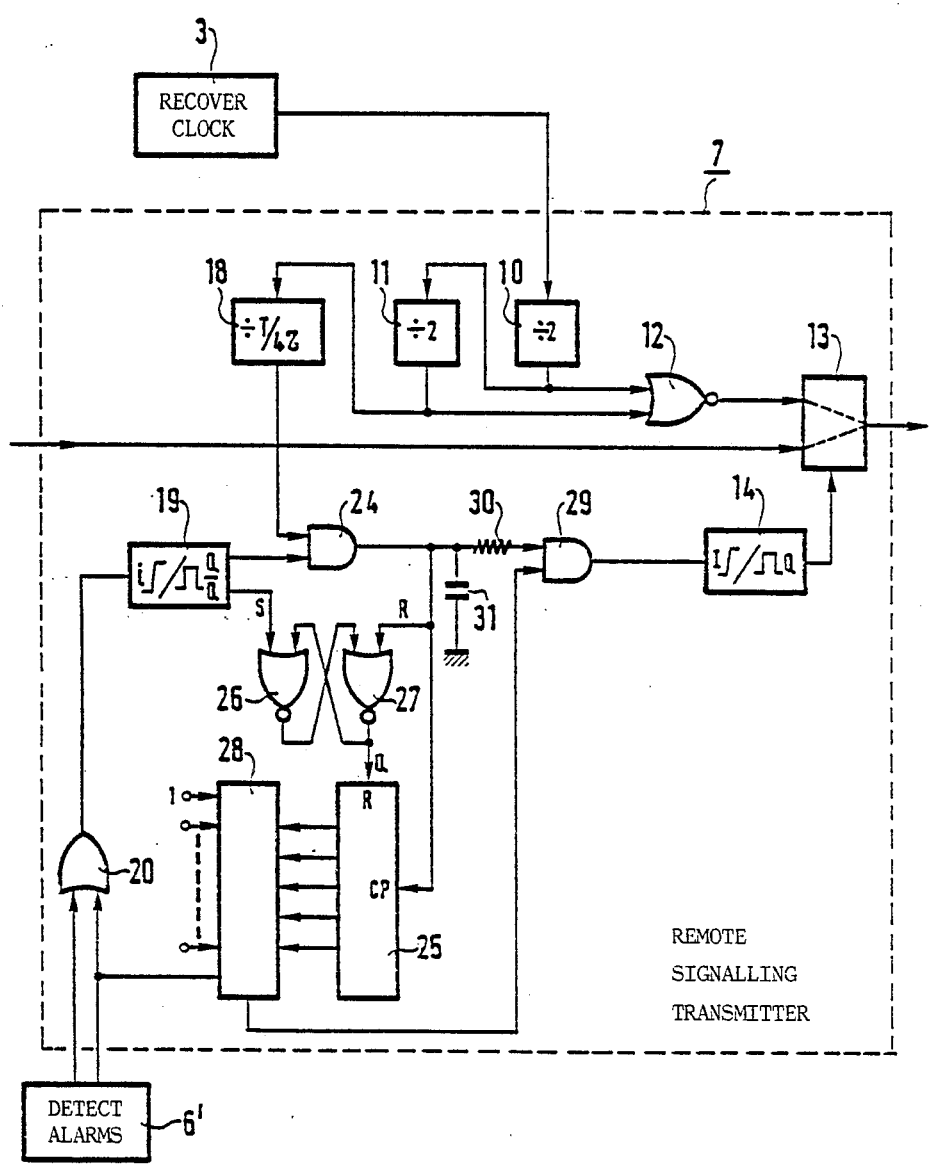
FIGS. 2 and 3 are circuit diagrams respectively of a transmitter and a receiver for one with remote signalling messages in accordance with the invention.

FIG. 2 shows an embodiment of a remote signalling transmitter circuit. This circuit, referenced 7, comprises:

a generator for repeatedly generating the pattern 1000, the generator being constituted by two divide-by-two circuits 10, 11 which are connected in cascade to the output from the bit rate recovery circuit 3, together with a two-input logic NOR gate 12 having its inputs respectively connected to the input and to the output of the second divide-by-two circuit 11;

a switch constituted by a two-input multiplexer 13 having one input connected to the output of the NOR gate 12 of the pattern generator, having its other input connected to the digital stream regenerator circuit (4, FIG. 1), and having its output connected to the optical modulator (5, FIG. 1);

a first monostable 14 triggerable by a rising edge and having an unstable state of duration t which corresponds to the duration of one sequence, said first monostable controlling the addressing of the two-input multiplexer 13 in such a manner as to direct the signal from the digital stream regenerator circuit to the optical modulator so long as the monostable is in its stable state, and to direct the signal from the pattern generator to the modulator when the monostable is in its unstable state;

a generator for generating the sequence succession rate 1/T by dividing the frequency of the output signal from the clock recovery circuit 3 by T/τ ($3\times2^{10}$), where τ is the bit period of the digital stream, said generator circuit being constituted by a divide-by-($3\times2^8$) circuit 18 connected to the output from the divider 11;

a second monostable circuit 19, triggered by a rising edge and having an unstable state of duration D which corresponds to the duration of an entire remote signalling message, the second monostable circuit being triggered by the circuit 6' for detecting and handling alarms via a logic OR gate 20 having two inputs connected to respective alarm outputs from said circuit 6';

a first logic AND gate 24 having one input connected to the Q output from the second monostable circuit 19 and having another input connected to receive the output signal from the divider 18 in order to provide the sequence succession rate throughout the duration of a remote signalling message;

a divide-by-ten counter 25 having parallel outputs and clocked by the signal at the sequence succession rate 1/T which is applied thereto via the first AND gate 24 solely during a remote signalling message, and which is held at zero at other times by means of an RS type bistable which is represented by two NOR gates 26 and 27 having a Q output connected to the reset to zero input of the counter, having an R input connected to the output from the AND gate 24, and having an S input connected to the complemented output Q of the second monostable 19;

a ten-input multiplexer 28 which is addressed by the counter 25, said multiplexer having a zero order input corresponding to the zero state of the counter and set to logic level 1, eight following inputs in counter addressing order set to logic levels which encode the identification number of the repeater, and a last input connected to one of the alarm outputs of the circuit for detecting and handling alarms 6'; and a second logic AND gate 29 having a first input connected to be controlled by the output from the ten-input multiplexer 28, having an output connected to the trigger input of the first monostable 14, and having another input connected to receive the sequence succession rate signal from the output of the first AND gate 24 throughout the duration of each remote signalling message, said connection being via a delay circuit constituted by a resistance 30 and a capacitance 31 which serve to compensate for the delay due to the propagation time of the divide-by-ten counter 25 and of the ten-input multiplexer 28.

In the absence of any alarm, the circuit for detecting and handling alarms 6' holds both of its outputs to logic level zero, thereby giving rise to logic level zero at the output from the OR gate 20 and thus leaving the second monostable circuit 19 in its stable state. When in its stable state, the second monostable circuit 19 closes the logic AND gate 24 and thereby prevents the sequence succession rate 1/T from being transmitted to the counter 25. The second monostable 19 also forces the counter 25 into its zero state, thereby closing the second AND gate 29 and thus leaving the first monostable 14 in its stable state. While the first monostable 14 remains in its stable state, the multiplexer 13 keeps the input of the optical modulator in connection with the output from the digital stream regenerator circuit.

Once an alarm appears, one or other of the outputs from the circuit 6' for detecting and handling alarms changes over to a logic 1 state, which is propagated through the OR gate 20, and its rising edge triggers the second monostable circuit 19 to take up its unstable state for the duration of one remote signalling message, i.e. for 80.72 μs. The second monostable acts firstly to open the AND gate 24 and thereby pass the sequence succession signal at the rate 1/T to the second AND gate 29, and secondly to release the counter 25 which begins counting as from the second rising edge in the signal at the rate 1/T, thereby scanning through the inputs of the multiplexer 28 at the succession rate of intervals of duration T. The rising edges of the sequence succession signal at the rate 1/T which pass through the logic AND gate 29 during the duration of a remote signalling message serve each time to trigger the first monostable 14 which causes the multiplexer 13 to insert a pattern sequence into the digital stream instead of data. The first rising edge in the sequence succession signal at the rate 1/T always passes through the logic AND gate 29 since the zero order input to the multiplexer 28 is set to logic level 1. Each of the eight following edges either passes through or does not pass through the AND gate 29 depending on the logic level applied to successive multiplexer inputs in positions 1 to 8 in count order, thereby encoding the identification number of the repeater in question. The last or tenth edge in the sequence succession signal at the rate 1/T to be enabled by the second monostable circuit 19 either passes through or does not pass through the AND gate 29 depending on the logic level at the order 9 input to the multiplexer 28, which logic level depends on the type of alarm indicated by the circuit 6' for detecting and handling alarms. Once the tenth edge in the sequence succession signal at rate 1/T has passed, the second monostable 19 returns to its stable condition, thereby resetting the counter 25 to zero and closing the logic AND gate 24 to prevent any further sequence from being inserted in the digital stream.

Any further transmission of a remote signalling message requires both outputs from the circuit 6' for detecting and handling alarms to return to logic level zero, which may take place, for example, after a remote control reset to zero signal has been sent to said circuit.

It should be observed that only a small number of components need to be very high speed ECL technology components compatible with a 344 Mbits/s data rate. Such components are very energy hungry, and in the present case they are constituted by the pattern generator components (two JK type bistables acting as dividers, and a logic NOR gate), the switching for inserting sequences into the digital stream instead of data, and perhaps the first few stages of the sequence rate generator. The remainder of the circuit, i.e. the majority of its components, operate at a much lower rate of about 2.8 Mbits/s and may be implemented in slower technology such as I²L or Schottky technology which are less energy hungry.

Figure 3:
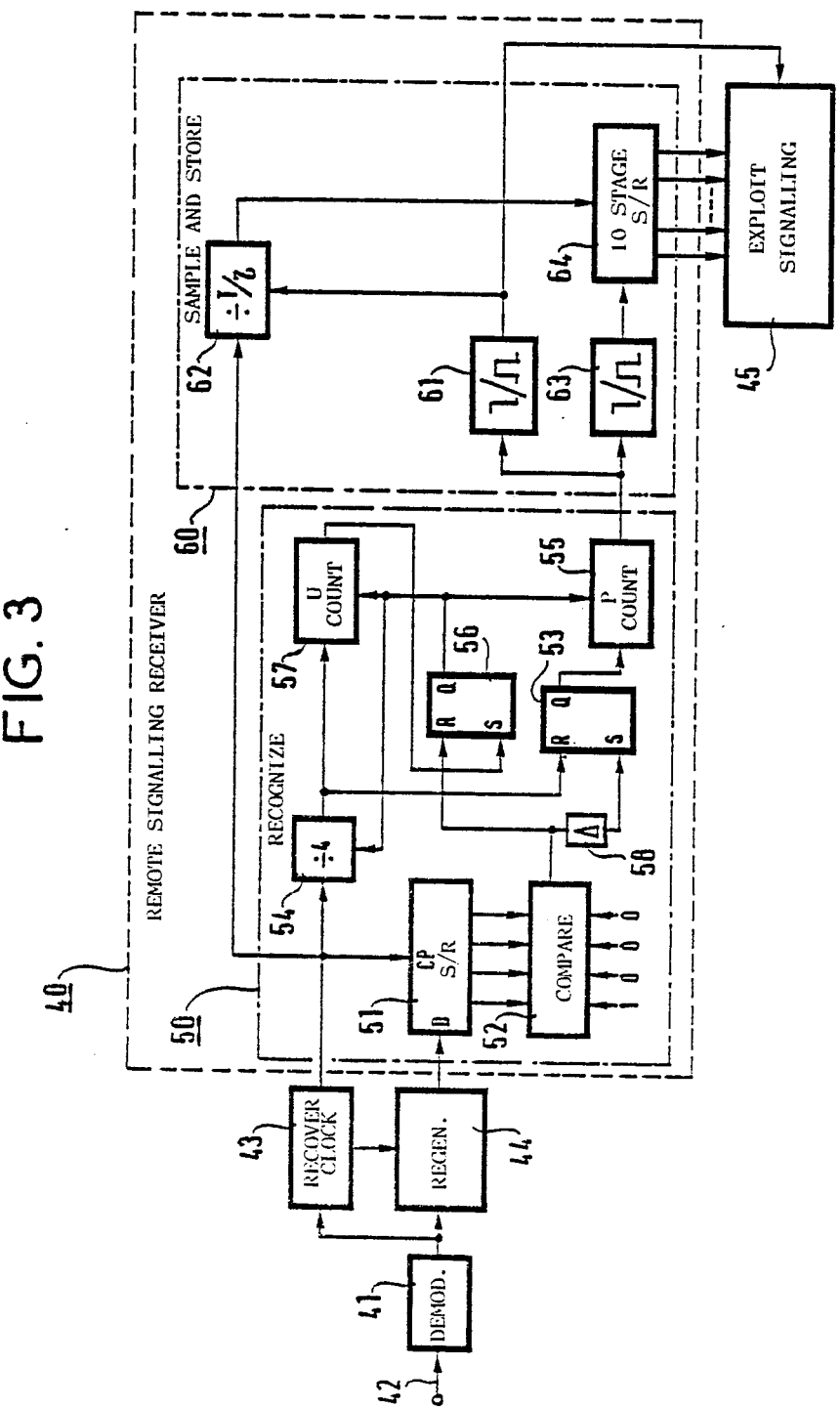

FIG. 3 is a circuit diagram of one embodiment of a remote signalling receiver circuit 40, with the receiver circuit 40 shown in its environment between path receiver terminating equipment and a circuit 45 for exploiting the received signalling. The path receiver equipment is represented by an opto-electronic demodulator 41 at which an optical fiber 42 conveying the incoming digital stream terminates, together with electronic signal-shaping circuits constituted mainly by a bit rate clock recovery circuit 43 and a regenerator circuit 44. Terminal equipment other than the remote signalling receiver is not described in greater detail since it lies outside the scope of the present invention.

The remote signalling receiver 40 comprises a recognition circuit 50 for recognizing b patterns amongst q.u successive bits in the digital stream conveyed over the link (where q=4), followed by a sampling and storage circuit 60 which operates at the rate 1/T at which sequences succeed one another in a remote signalling message.

The recognition circuit 50 for recognizing p patterns in 4.u bits in a digital stream comprises:

a four stage shift register 51 having a serial input and parallel outputs and connected to receive the regenerated digital stream from the regenerator circuit 44 on a data input and to receive bit rate clock signals from the bit rate recovery circuit 43 on a clock input;

a comparator 52 for comparing two 4-digit binary numbers and having one 4 bit input hardwired to logical levels 1000, and having another 4 bit input connected to the parallel output from the shift register 51;

a coincidence detector constituted by an RS bistable 53 having its S input connected to the outputs of the comparator 52 via a circuit 58 for providing a small delay;

a pattern rate generator constituted by a divide-by-four circuit 54 operating at the bit rate as supplied by the bit rate recovery circuit 43 and serving to reinitialize the coincidence detector by applying a logic level 1 to its R input at the pattern succession rate;

a p counter circuit 55 having a count input responsive to rising edges connected to the Q output from the RS bistable 53 which constitutes the coincidence detector, and serving to count recognized patterns;

a trigger circuit constituted by an RS type bistable 56 having its Q output connected to reset to zero inputs of the divide-by-four circuit 54 and the p counter 55, and having its R input connected to the output from the comparator 52, said trigger circuit serving to enable or to keep enabled both the divide-by-four circuit 54 and the p counter 55 on each positive response of the comparator; and a u counter 57 (u>p) whose count input is responsive to rising edges and is connected to the output from the divide-by-four circuit 54 which constitutes the pattern rate generator, and whose reset to zero input is connected to the Q output from the RS bistable 56 which constitutes the trigger circuit, and which serves to reinitialize the recognition circuit 50 by reinhibiting its trigger circuit after a period of time corresponding to 4.u successive bits in the received digital stream.

Each time a 1000 type pattern appears in the received stream, the comparator 52 detects it and delivers a positive output pulse which serves firstly to bring the Q output of the RS bistable 56 to the logic zero state or to maintain said output in said state, thereby enabling or maintaining in the enabled state the divide-by-four circuit 54 and the p and u counters 55 and 56. Then, after a short delay the positive comparator pulse causes the RS bistable 53 which constitutes the coincidence detector to change over to logic level 1, thereby incrementing the p counter 55. After a period of time corresponding to one-half of a pattern, the output from the divide-by-four circuit 54 passes to logic level 1, thereby reinitializing and inhibiting the coincidence detector whose Q output returns to zero, and also incrementing the u counter 57. After a period of time corresponding to the duration of one pattern, the output from the divide-by-four circuit returns to logic level zero, thereby re-enabling the coincidence detector to detect and count further patterns. At the u-th period in the signal delivered by the divide-by-four circuit 54, the u counter 57 provides a logic level 1 signal at its output, thereby stopping the process and acting via the trigger circuit to reset the divide-by-four circuit 54 to zero and to reset both the p and u counters 55 and 57 to zero. Meanwhile, the output from the p counter 55 passes to logic level 1 if p or more patterns have been recognized.

The p counter 55 may be an eight counter, for example, and the u counter 57 may be a nine counter.

The sampling and storage circuit 60 which follows the recognition circuit 50 comprises:

a first monostable circuit 61 triggerable by a falling edge and having an unstable period whose duration is slightly greater than the period B of a remote signalling message 85 $\mu s$ in the present example) and controlled by the count output from the p counter 55;

a generator for generating the sequence succession rate 1/T constituted by a divide-by-T/$\tau$ circuit 60 (i.e. a circuit for dividing by $3.2^{10}$ in the present example) operating on the clock signal delivered by the bit rate recovery circuit 43 and held in the zero state except when the first monostable 61 is in its unstable state;

a second monostable circuit 63 which is triggerable by a falling edge and which has an unstable state whose duration is slightly greater than one-half of the time interval T separating two sequences plus the duration of a sequence (5 $\mu s$ in the present example), and controlled by the count output from the p counter 55; and a ten stage shift register 64 having a serial input and parallel outputs which receives the signal from the second monostable circuit 63 on its data input and which has its clock input connected to the divider 62 to receive the signal at the sequence succession rate 1/T.

In response to a first sequence of a remote signalling message, the p counter 55 of the recognition circuit 50 delivers an output binary signal capable of including several pairs of positive and negative transitions which correspond respectively to instants at which the thresholds p and u of the counters 55 and 57 are exceeded, with the number of such transitions being equal to not more than the number of groups of u patterns contained in a sequence. The first negative transition represents reception of a message prefix sequence. It triggers the first monostable circuit 61 which enables the divide-by-T/ circuit 62 for generating the sequence succession rate 1/T, and it is stored by the second monostable circuit 63. Half a time interval (T/2) after the appearance of this first negative transition, there is a positive transition in the signal from the divider 62 which causes the register 64 to shift a first time, thereby copying a logic level 1 into the first stage of this register. Before the end of the first time interval T, the first monostable circuit 63 returns to its stable state to be ready to record the presence or absence of a sequence at the beginning of the next time interval P, which presence or absence is copied into the shift register 64 in the middle of said interval, and so on until the first monostable circuit 61 returns to its stable state after an entire message has been copied into the shift register 64.

The circuit 45 for exploiting the signalling receives the binary number encoding the remote signalling data from the parallel output of the shift register 64, and it receives authorization to take this number into consideration from the output of the first monostable circuit 61 which applies a signal thereto on returning to its stable state.

There are several circuits in the receiver circuit which operate at a high data rate and which therefore require the use of an energy-hungry technology. However, this does not matter since there are generally very few circuits on any given digital link which exploit remote signalling, and it is unusual for such circuits to be remotely powered. This is in contrast to the transmitters of remote signalling which are numerous and which are generally remotely powered.

We claim:

1. An apparatus for performing a remote signalling method for a digital transmission link, said method comprising transmitting the signalling by means of a digital message at the same rate as the digital data stream conveyed by the link, which message momentarily takes the place of said digital data stream, wherein said digital message is constituted by not more than n identical and non-consecutive sequences of N bits, where n and N are integers greater than 1, which sequences succeed one another in n successive time intervals of duration T, the first sequence being present whenever a message is sent, and the presence or absence of the other sequences during the following n−1 time intervals representing the values 0 or 1 of the n−1 digits of a binary number encoding remote signalling data, said apparatus including at least one equipment provided with a circuit for detecting and handling alarms and a circuit for recovering the bit rate from the digital data stream, said apparatus including at least one transmit circuit located in said equipment and serving to transmit a remote signalling message, said transmit circuit comprising:

pattern generator means for repetitively generating a pattern obtained by logically combining first subharmonics of the clock signal delivered by the bit rate recovery circuit;

switching means enabling the signal generated by the pattern generator means to momentarily replace the digital data stream conveyed by the link;

a first monostable circuit having an unstable state of duration t corresponding to the duration of a sequence, and connected to control the switching means to insert the signal generated by the pattern generator means in place of the digital data stream whenever said first monostable circuit is in its unstable state;

a second monostable circuit having an unstable state whose duration corresponds to the duration D of a remote signalling message, said second monostable circuit being triggered by said circuit for detecting and handling alarms;

means for generating a sequence succession rate (1/T) under the control of said second monostable and driven by the clock signal delivered by said circuit for recovering the bit rate;

a parallel output counter driven by said means for generating the sequence succession rate (1/T), and forced to a zero state by said second monostable circuit when in its stable state;

a multiplexer addressed by said counter to select an input corresponding to the state of the counter, the multiplexer input which corresponds to the counter being in the zero state being set to logic level 1, and the other inputs of the multiplexer being set to logic levels which encode remote signalling data; and a logic gate controlled by the multiplexer and controlling the application of the signal generated by the means for generating the sequence succession rate (1/T) to the trigger input of said first monostable circuit.

2. Apparatus according to claim 1, wherein the pattern generator means comprise a two-input logic NOR gate and divide-by-two circuits providing said logic gate with signals at one-fourth and at one-half of the frequency of the clock signal delivered by said circuit for recovering the bit rate.

3. An apparatus for performing a remote signalling method for a digital transmission link, said method comprising transmitting the signalling by means of a digital message at the same rate as the digital data stream conveyed by the link, which message momentarily takes the place of said digital data stream, wherein said digital message is constitute by not more than n identical and non-consecutive sequences of N bits, where n and N are integers greater than 1, which sequences succeed one another in n successive time intervals of duration T with each sequence constituted by a periodic configuration of bits obtained by repeating a pattern, the first sequence being present whenever a message is sent, and the presence or absence of the other sequences during the following n−1 time intervals representing the values 0 or 1 of the n−1 digits of a binary number encoding remote signalling data, the presence of said patterns being recognized by identifying p patterns from a string of q·u successive bits in the digital stream conveyed by the link, where p and u are integers greater than 1, and q is the number of bits in a pattern, said apparatus including at least one equipment provided with a circuit for exploiting said signalling and with a circuit for recovering the bit rate from the digital stream, said apparatus including at least one receiving circuit for receiving remote signalling messages, said circuit being located in said equipment and being constituted by a circuit for recognizing p patterns from q·u successive bits in the digital stream conveyed by the link, together with a sampling circuit connected to store samples at the sequence succession rate (1/T), said circuit for recognizing p patterns from q·u successive bit patterns comprising:

a serial-input/parallel-output shift register connected to receive the digital stream conveyed by the link and clocked by the clock signal generated by said bit rate recovery circuit, and delivering binary words having the same length as a pattern at its parallel output;

a comparator for comparing two binary numbers having the length of a pattern, one of said binary numbers being identical to a pattern and being hardwired, and the other of said binary numbers being the number delivered by the parallel output from the shift register;

a pattern rate generator constituted by divider driven by the clock signal generated by the bit rate recovery circuit;

a u counter driven by the output signal from the pattern rate generator and marking strings of q·u successive bits in the digital stream;

a coincidence detector connected to the output from said comparator and connected to be reinitialized at the pattern succession rate by the pattern rate generator:

a p counter driven by the output signal from said coincidence detector; and a trigger circuit which is connected to be activated by said comparator and to be reset to zero by said u counter, and which, while it is reset to zero, inhibits said pattern rate generator and maintains said p and u counters in their zero states.

* * * * *